US008720758B2

(12) United States Patent
Angeli et al.

(10) Patent No.: US 8,720,758 B2
(45) Date of Patent: May 13, 2014

(54) SHOE HOLDER SYSTEM FOR BICYCLE SADDLE (76) Inventors: Aldo Angeli, San Francisco, CA (US); Michele Angeli, Tuscany (IT)

(*) Notice: Subject to any disclaimer, the term of this patent is extended or adjusted under 35 U.S.C. 154(b) by 190 days.

(21) Appl. No.: 13/431,738

(22) Filed: Mar. 27, 2012

(65) Prior Publication Data
US 2013/0256353 A1    Oct. 3, 2013

(51) Int. Cl.
*B62J 9/00* (2006.01)
(52) U.S. Cl.
USPC ........... 224/427; 224/448; 224/453; 224/454; 224/455
(58) Field of Classification Search
USPC .......... 211/34, 35, 37, 38; 224/427, 431, 433, 224/440, 447, 448, 452–455, 460
See application file for complete search history.

(56) References Cited

U.S. PATENT DOCUMENTS

| | | | |
|---|---|---|---|
| 4,957,227 A * | 9/1990 | Trimble ........................ 224/414 |
| 5,496,089 A | 3/1996 | Muderlak | |
| 5,678,742 A * | 10/1997 | Lindauer ........................ 224/454 |
| 5,689,901 A * | 11/1997 | Bell et al. .......................... 36/7.6 |
| 5,845,830 A * | 12/1998 | Dreiling ........................ 224/415 |
| 7,264,308 B2 | 9/2007 | Bigolin | |
| 2005/0258208 A1* | 11/2005 | Pickett .......................... 224/427 |
| 2008/0122271 A1 | 5/2008 | Bigolin | |
| 2009/0146397 A1* | 6/2009 | Steere ........................... 280/624 |
| 2010/0264184 A1* | 10/2010 | Retief ........................... 224/427 |
| 2011/0121044 A1 | 5/2011 | Schopf | |

* cited by examiner

*Primary Examiner* — Brian D. Nash
*Assistant Examiner* — Corey Skurdal
(74) *Attorney, Agent, or Firm* — Steven A. Nielsen; Allman & Nielsen, P.C.

(57) ABSTRACT

Embodiments of the disclosed systems are useful to participants in triathlons who wish to transport their own running shoes while bicycling. Athletic shoes are transported behind a bicycle saddle by use of an arm bracket 300 attaching to saddle rails 101. The arm bracket comprises an attachment section 307, a neck section 317 and two antler 301 styled sections. Each antler section includes an outer prong area 313 and an inner prong area 314. A shoe holder 200 attaches to each antler section wherein voids within the shoe holders match the voids found within the arm bracket components. The side components of the shoe holders assist in preventing rotational movement of a shoe. Each shoe holder further comprises a rear retainer section 208 having an upper arch edge 209, useful in allowing the shoe holder to flex inwardly or outwardly to facilitate the ingress or egress of a shoe.

9 Claims, 9 Drawing Sheets

SHOE HOLDER SYSTEM FOR BICYCLE SADDLE

BACKGROUND OF THE INVENTION (1) Field of the Invention

The invention generally relates to bicycle accessories. More particularly, the invention relates to means and methods of attaching athletic shoes to a bicycle saddle.

(2) Description of the Related Art

U.S. Pat. No. 4,957,227 by Trimble discloses support rails to attach a water bottle to the rear section of a bicycle saddle. The bracket of Trimble fails to accommodate or even contemplate a bracket for securing athletic shoes.

U.S. Pat. No. 5,496,089 by Muderlak discloses a complex clip attachment assembly that integrates into a bicycle seat. Muderlak requires the use of a bulky receiver unit. The system of Muderlak is prone to breakage as users press upon a disengage pawl.

U.S. Pat. No. 7,264,308 by Bigolin discloses a quick release system to secure a bracket behind a bicycle saddle. Bigolin is not well suited for current bicycle saddles as the Bigolin system requires at least one component to be integrally and monolithically formed into the body of the saddle.

U.S. published patent application 2008012271 by Bigolin discloses a bicycle saddle for retaining a water bottle. The Bigolin system, while stylish, requires specialized moldings and saddle construction. Thus, the Bigolin system will not adapt to standard bicycle saddles.

U.S. published patent application 20110121044 by Schopf discloses a box system with latches and other means of mechanically closing the box. The Schopf system requires a rider to manipulate a latch system to gain access to stored goods, thus placing a rider at risk of crashing.

The known prior art fails to provide either means or methods of conveniently securing a pair of running shoes behind a bicycle saddle.

BRIEF SUMMARY OF THE INVENTION

The present invention overcomes shortfalls in the related art by presenting an unobvious and unique combination, configuration and use of both flexible and inflexible compounds and assemblies to conveniently attach a pair of running shoes to the rear of a bicycle seat. Unlike the known prior art, embodiments of the present invention do not require any permanent modifications to a bicycle saddle. Unlike the multi-walled structure of Schopf, the present invention does not encase items, but instead uses a minimalist flexible cup system to secure athletic items.

Embodiments of the invention include means and methods of attaching running shoes or other types of shoes by use of a flexible cupped shoe holder having a unique and artful design as shown and described herein. Embodiments of the disclosed shoe holders feature an elastic side portions with key hole floors, allowing shoe heels to be rigidly mounted in one motion and with one hand. As the heel of a shoe is inserted into the open section of a shoe holder, the sides of the shoe holder temporarily expand to accept the shoe. Upon full insertion, the sides of the shoe holder press inwardly, securing the shoe. The key hole design of the shoe floor facilitate the movement of the shoe holder sides.

The shoe holder sides feature curvatures having a wide section toward the saddle area and an opposite side tapered section. The wide section secures the rear heel section of a shoe and area of the shoe most suitable for side retaining pressure. The side tapered section is near the arch section of a shoe, thus the side tapered section attaches mostly to the lower sole area of a shoe.

The rear wall section of the shoe holder sometimes has an upper arch that may allow for an inward flexing to further secure the shoe and to facilitate ingress and egress of the shoe.

The floor section of the shoe holder defines various attachment voids. The attachment voids containing fasteners attaching the shoe holder to one of the "antler horns" of the disclosed arm bracket. Each horn section of the arm bracket defines a key hole section complementary to the key hole section of a shoe holder floor and a plurality of voids complementary to the fastener voids of the shoe holders. The fastener voids of the horns may be elongated to facilitate positional adjustments in securing a shoe holder to a horn. Thus, the position of each floor half may be set inwardly or outwardly to accommodate a user's particular shoe heel configuration.

The middle section of the arm bracket features a center key hole area and a neck section that attaches to an arm bracket section. The arm bracket section may be rigidly attached to the neck section or may be hingedly attached to the neck section. In yet another embodiment, the neck section is attached to the arm bracket section by means that allow for a quick or tool less detachment of the neck section from the arm bracket section.

The arm bracket section has a plurality of voids allowing for fasteners to be inserted into a free floating bracket. The free floating bracket having a plurality of complementary voids and the free floating bracket having vertical cylindrical void sections configured to accept guide rails of a saddle. The guide rails of the saddle may be typical guide rails found in most bicycle saddles.

Embodiments of the invention allow users who are sometimes participants in various triathlon events the ability to transport their running shoes upon their bicycle. Other means or methods of carrying shoes upon a saddle are unknown in the prior art for various reasons, including the long standing tradition of triathlon events having prescribed staging areas where running shoes are stored in a fixed location. Such prescribed storage of running shoes requires triathlon participates to back track to a staging area to retrieve their shoes.

Embodiments of the disclosed invention facilitate the modern trend of "illegal triathlons" wherein a participant may ride their bicycle to an unmanned venue, dismount from their bicycle, remove their running shoes from the shoe holders, run a course, return to their bicycle, replace their running shoes into the shoe holders, and then ride their bicycles to another location. The ability of a triathlon athlete to transport their own running shoes encourages more free-form training and opens up new course possibilities to organized triathlon events.

REFERENCE NUMERALS IN THE DRAWINGS

100 a bicycle seat or saddle
101 saddle rails, found on the bottom of a saddle
102 bicycle seat post
103 bicycle seat frame
200 a shoe holder
201 the bottom surface of a shoe holder 200
202 forward edges of shoe holder 200 voids within the shoe holder
203 inner straight edges of shoe holder 200
204 outer void area of shoe holder, defined by inner straight edges 203 of a shoe holder
205 circle transition points found at medial ends of inner straight edges 203 of a shoe holder 200
206 inner circular void, defined by the bottom surface 201 a shoe holder and by the circle transition points of the inner straight edges 203
207 horizontal retainer strips attached to bottom surface 201
208 rear retainer section of shoe holder 200
209 upper arch edge of rear retainer section 208
210 sidewall void area of shoe holder 200
211 screws, bolts or other fasteners used to secure a shoe holder 200 to a antler section 301 of an arm bracket 300
212 nuts or other fasteners used to retain screws 211
213 voids defined within medial area of the shoe holder
214 upper floor area of shoe holder
215 inner surface of rear retainer section 208 of the shoe holder 200
216 safety leash attached to shoe holder, used to further retain a shoe
217 a buckle or other means of securing a safety leash 216
218 slanted strip section of shoe holder, attached or part of horizontal retainer strip 207 and the rear retainer section 208.
300 a bracket arm
301 a deer antler section or antler section of a bracket arm 300
302 a line parallel to the arm bracket 100, the line starting at the antler void apex
303 apex of antler void area 304
304 antler void area defined by the inner edges of the two antler sections 301
305 inner edges of antler sections 301
306 oblong voids for fasteners found within the antler sections 301
307 attachment section of arm bracket 300
308 counter plate
309 cylinder void areas of counter plate, used to accept saddle rails 101
310 voids defined within the counter plate 308
311 voids defined within the attachment section 307 of the arm bracket 300
312 screws, bolts or other types of fasteners used to attach the attachment section 307 and counter plate 309 to a saddle rail 101
313 an outer prong area of a antler section
314 an inner prong area of an antler section
315 inner center prong void, defined by inner edges of an inner prong area 314 and an outer prong area 313
316 a center circle void defined within the center sections of an antler area 301 and by the inner edges 315 of an outer prong area 313 and an inner prong area 314
317 neck section of bracket arm 300
318 a boundary line between the attachment section 307 and the arm bracket 300
319 inner edges found between an outer prong area 313 and an inner prong area 314
320 alternative fastener voids within the antler sections 301
400 typical athletic shoe or footwear
401 the bottom sole area of a shoe 400

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

Figure 1:
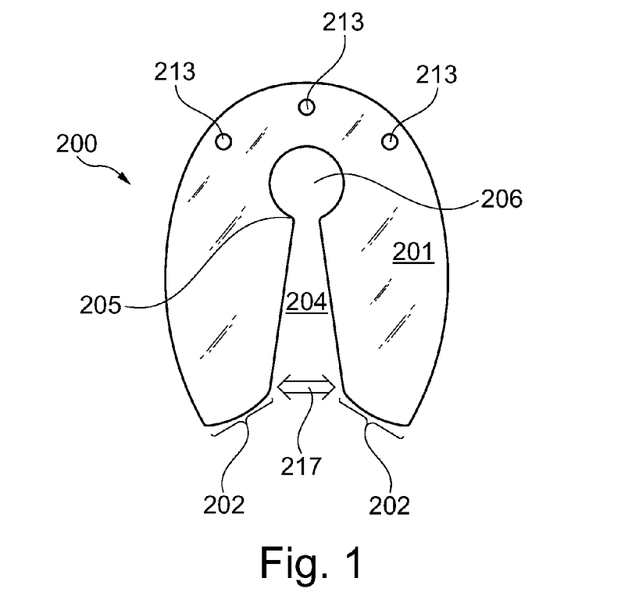
FIG. 1 is a plan view showing the bottom side of a shoe holder

Referring to FIG. 1, the bottom side of a shoe holder 200 is shown having a bottom surface 201. Two forward edges 202 are found at the distal area of the shoe holder and connect to two inner straight edges 203. An inner circular void 206 is defined by the medial area of the shoe holder and by the two inner straight edges 203. The juncture or connection point between the inner circular void 206 and either straight edge 203 is a circle transition point 205. An outer void area 204 is defined by the two inner straight edges 203 and the two forward edges 202.

When accepting a shoe, the inner straight edges 203 may flex outwardly so as to create an adequate space to accept a shoe. After a shoe is accepted, the outer straight edges may flex inwardly or move inwardly toward their original positions. The inward and outward movements of the straight edges 203 is shown by the bidirectional arrow 217 shown in between the two straight edges 203. The inner circle void 206 assists in allowing the two straight edges to flex inwardly and outwardly. The inner circle void helps to prevent cracks or damage to the material comprising the shoe holder 200.

Figure 2:
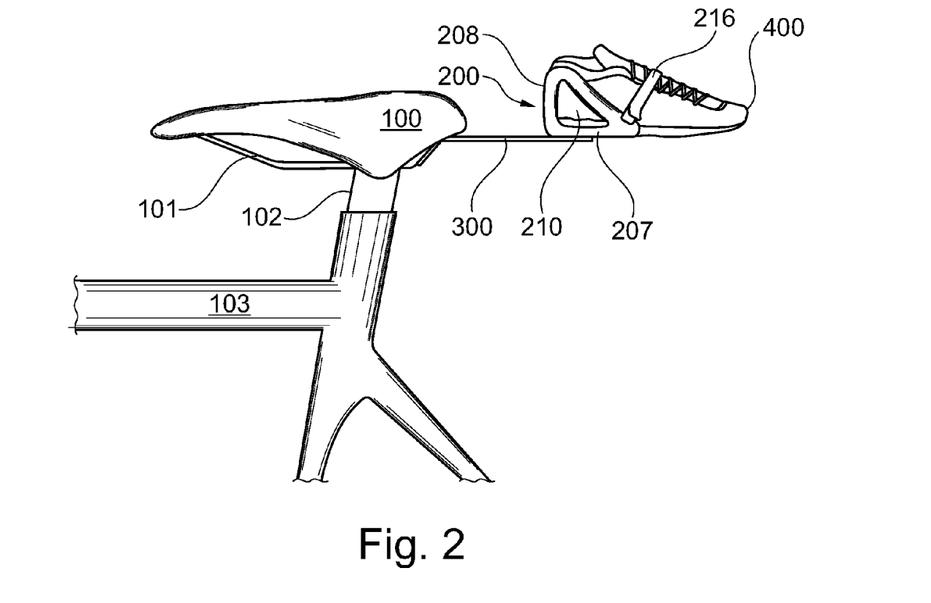
FIG. 2 elevational view of one embodiment of the invention

FIG. 2 shows an elevation view of a bicycle frame 103 supporting a saddle post 102. The straddle post may be attached to saddle rails 101, the saddle rails 101 being attached to a saddle 100 or bicycle seat. A bracket arm 300 is attached to the saddle rails 101. The bracket 300 arm is further attached to a shoe holder 200 and a shoe 400 is attached to a shoe holder. The shoe holder is shown having a horizontal retainer strips 207. The shoe is further secured by use of a safety leash 216.

Figure 3:
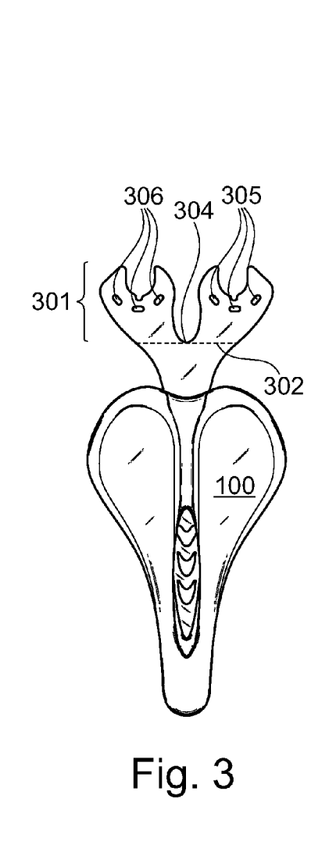
FIG. 3 is a top plan view of the top surface of a bracket arm

FIG. 3 shows a saddle 100 attached to an arm bracket 300, with the arm bracket having two antler sections 301, or deer antler sections. An antler section 301 being defined as the area distal to the saddle, starting at line 302, the line being parallel to the attachment section 307 (shown on FIG. 6) of the bracket arm with a starting point at the apex 303 of the antler void area 304 (shown on FIG. 5).

Figure 4:
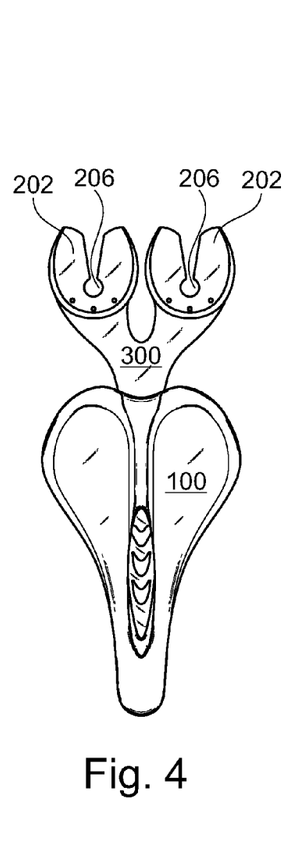
FIG. 4 is a top plan view of shoe holders attached to a bracket arm

FIG. 4 is similar to FIG. 3, but two shoe holders 200 have been added to each antler section 301. The shoe holders 200 are shown with forward edges 202 and inner circular voids 206.

Figure 5:
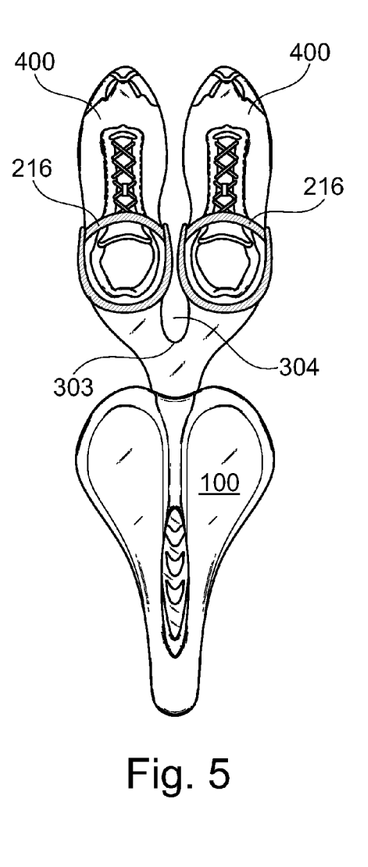
FIG. 5 is a top plan view of shoes retained in shoe holders

FIG. 5 is similar to FIG. 4, but two shoes 400 have been inserted into the two shoe holders. Two safety leashes 216 are shown. The bracket arm is shown having a antler void area 304 and the antler void area 304 is shown having an apex 303.

Figure 6:
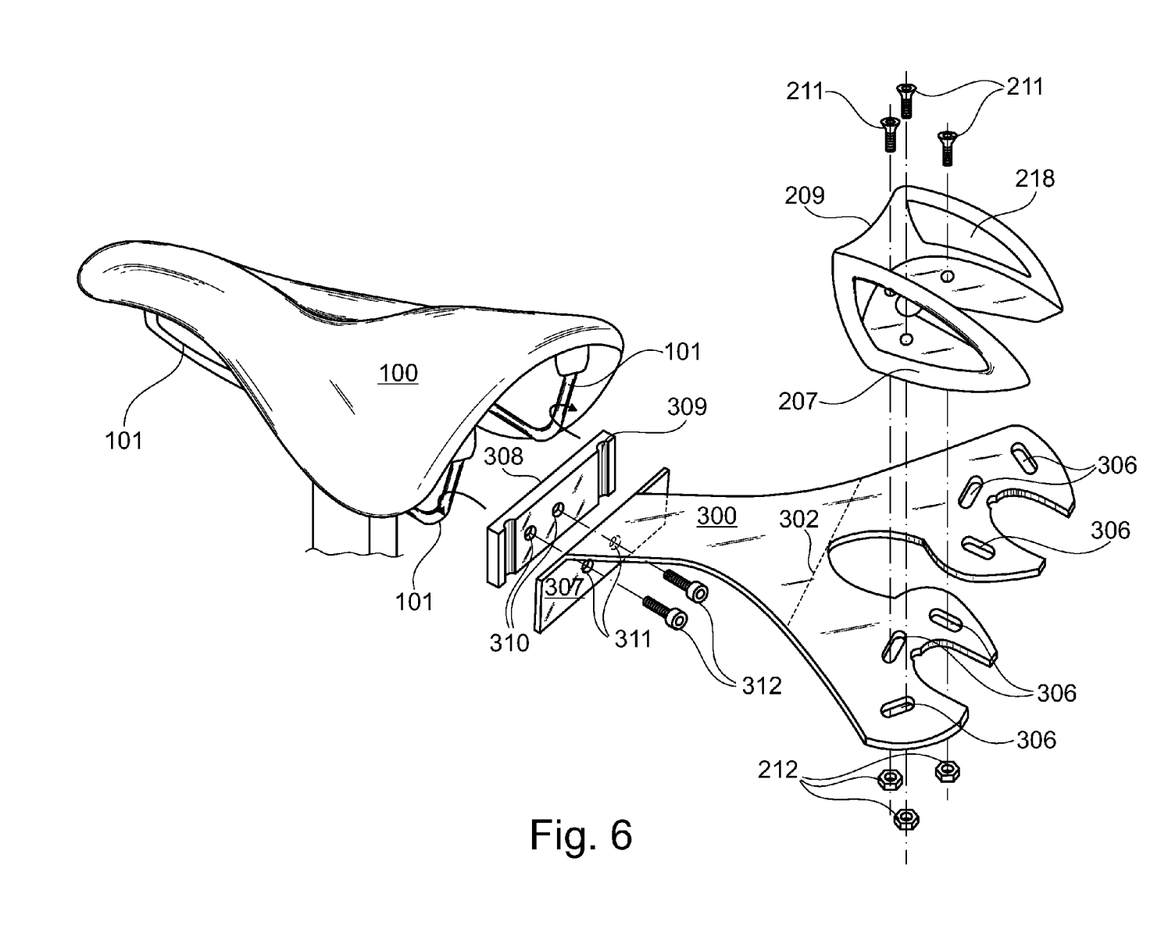
FIG. 6 is an exploded perspective view of one embodiment of the invention

FIG. 6 presents an exploded view illustrating the attachment of a shoe holder to an arm bracket 300 and the attachment of a saddle 100 to an arm bracket. The shoe holder 200 has a plurality of voids shown upon the upper floor 204 of the holder, the voids (shown as 213 in FIG. 1) accepting a plurality of screws or bolts 211, the bolts also entering the plurality of oblong voids 306 of the bracket arm. Nuts 212 or other fasteners are shown securing to the plurality of bolts 211.

The arm bracket 300 is shown with an attachment section 307, the attachment section having a planer body attached to the arm bracket at an angle between 20 degrees to 100 degrees. A counter plate 308 is shown with a pair of cylinder void areas 309, with the cylinder void areas accepting saddle rails 101, allowing for the counter plate 308 to be attached to the attachment section 307 of the arm bracket 300 wherein the arm bracket is held in place by virtue of the saddle rails 101 being attached or integral to the saddle 100. Screws, bolts 312 or other types of fasteners are shown entering voids 311 of the attachment section 307 and voids 310 of the counter plate 308.

Figure 7:
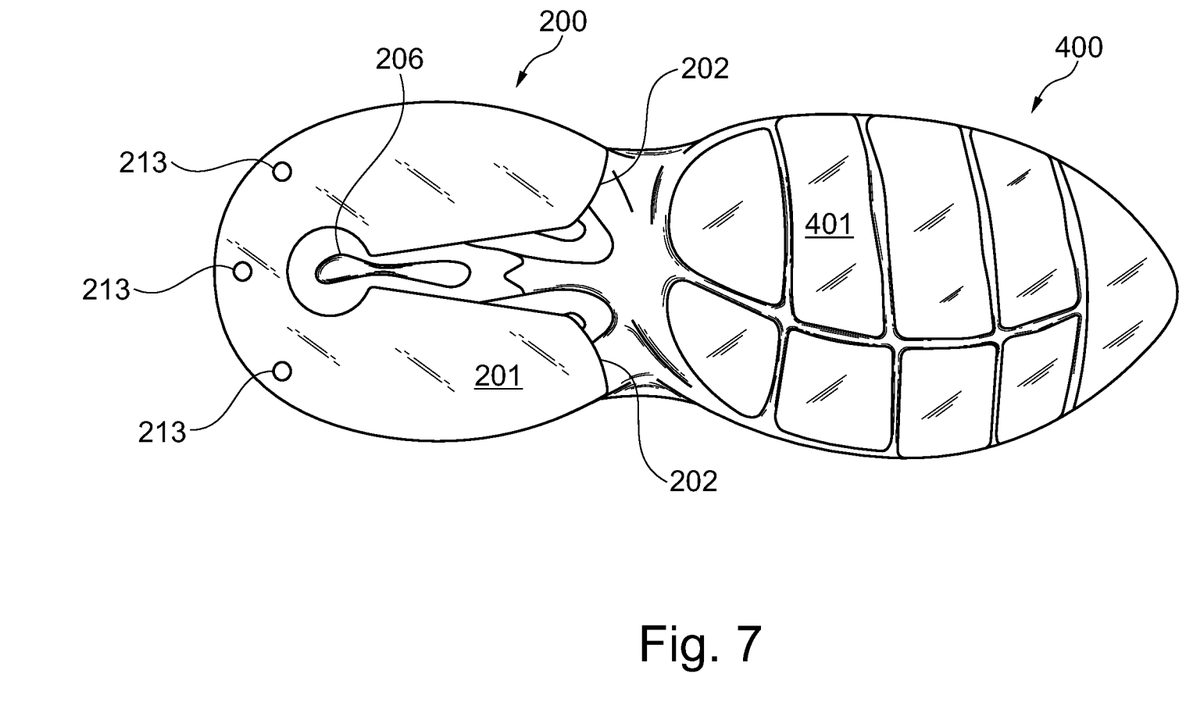
FIG. 7 is bottom plan view of a shoe holder retaining a shoe

FIG. 7 presents the bottom side of a shoe holder 200 and the bottom side 401 of a shoe, the shoe having a heel section secured within the shoe holder.

Figure 8:
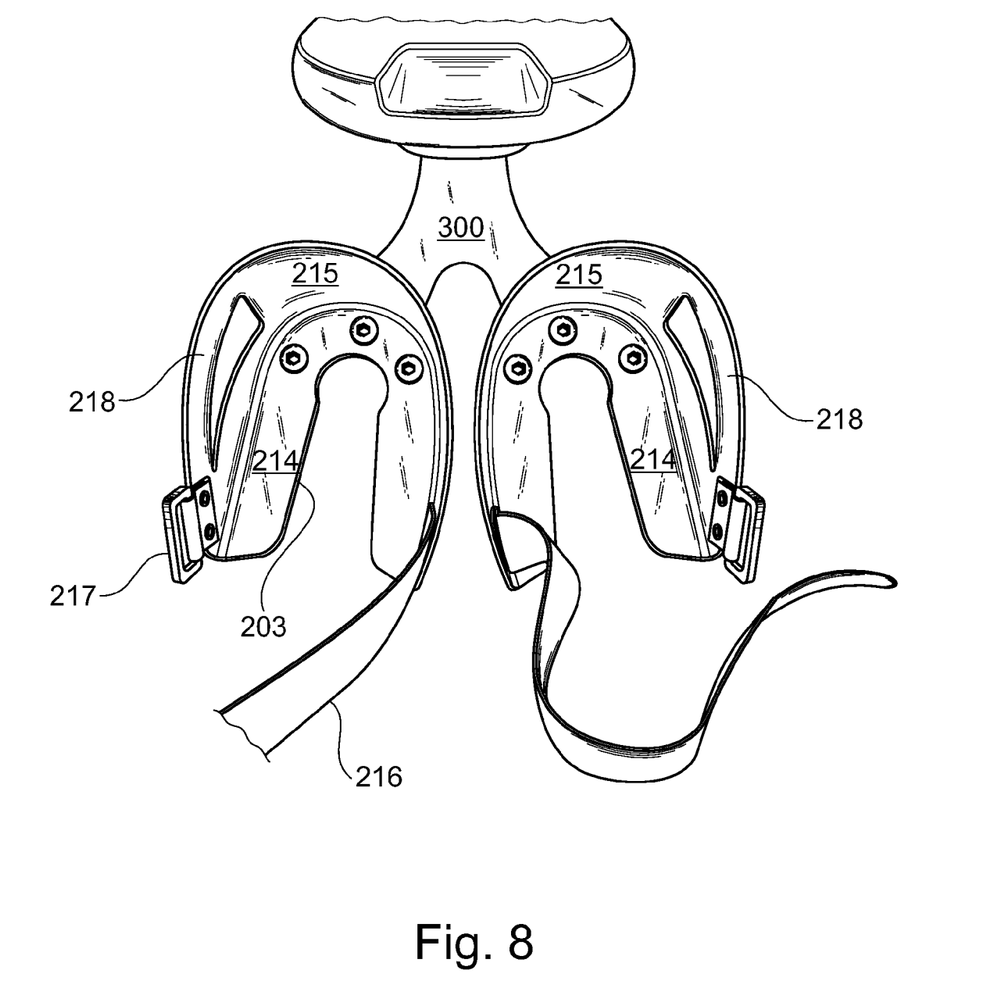
FIG. 8 is a perspective view of two shoe holders attached to an arm bracket

FIG. 8 presents a saddle 100 attached to an arm bracket 300 and with two shoe holders 200 attached to the arm bracket 300, or more particularly, attached to the antler sections of the arm bracket. A plurality of fasteners 211 are shown upon the upper floor area 214 of a shoe holder. An inner surface 215 of the rear retainer section is shown. Safety leashes 216 are shown in attachment to each shoe holder and each show holder is shown with a buckle 217 or other means of securing a safety leash 216.

Figure 9:
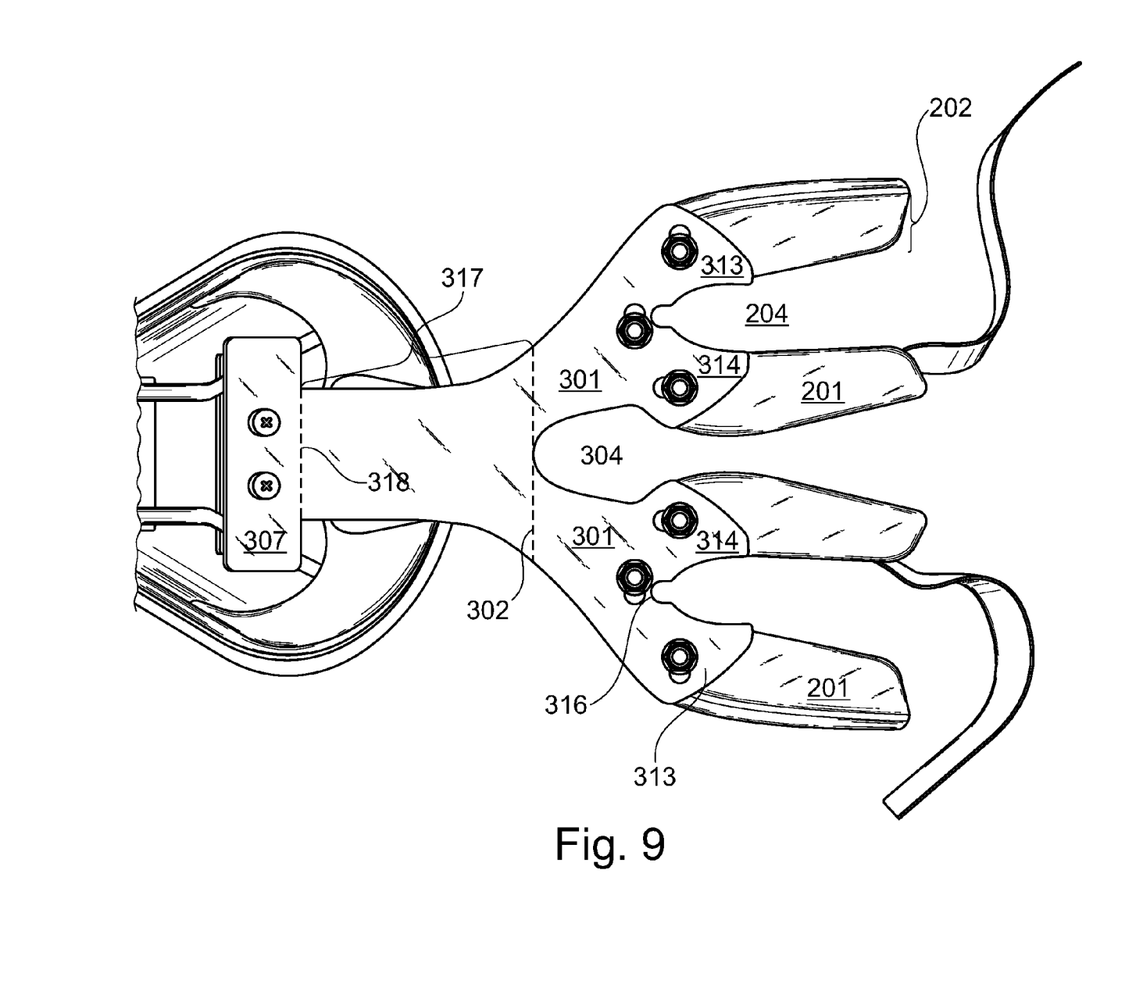
FIG. 9 is a bottom plan view of an arm bracket with two attached shoe holders

FIG. 9 presents a bottom plan view of an attachment section 307 attached to a saddle rail 101 and an arm bracket 300 welded or otherwise joined to the attachment section 307. The arm bracket having a neck section 317, the neck section defined as the area between line 318 and boundary line 302. At boundary line 302 the neck section 317 transitions into either antler section 301. Each antler section comprises an outer prong area 313 and an inner prong area 314. The inner and outer prong areas share inner edges 319. The inner edges 319 of the prongs are complementary to the outer void area 204 of the shoe holder.

Figure 10:
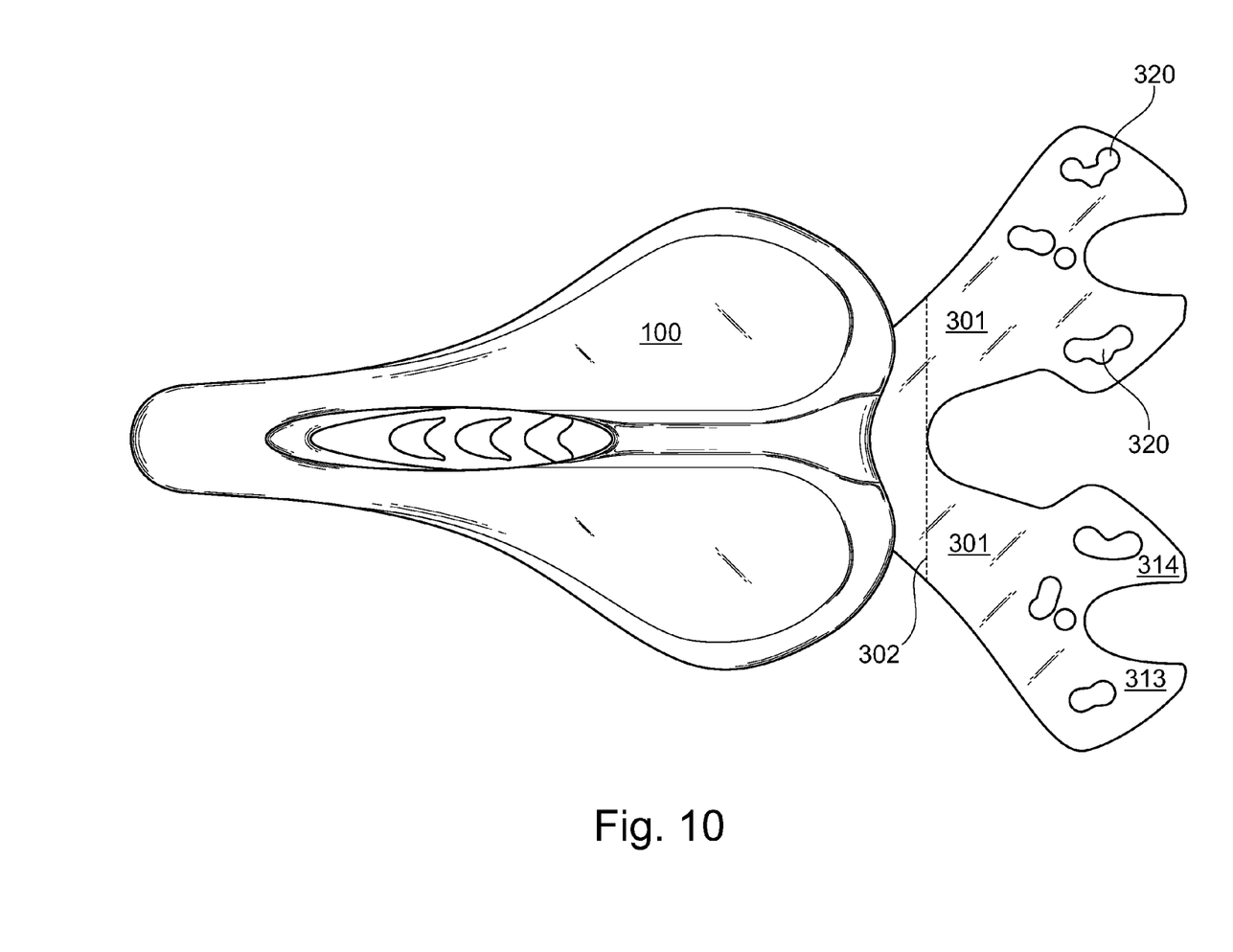
FIG. 10 is a top plan view of an arm bracket attached to a saddle

FIG. 10 presents a top plan view of a saddle 101 and an obstructed view of an arm bracket 300. The antler sections 301 are shown with alternative embodiment attachment voids 320, which are sometimes in a figure eight configuration, allowing for more customized positioning of a shoe holder.

Figure 11:
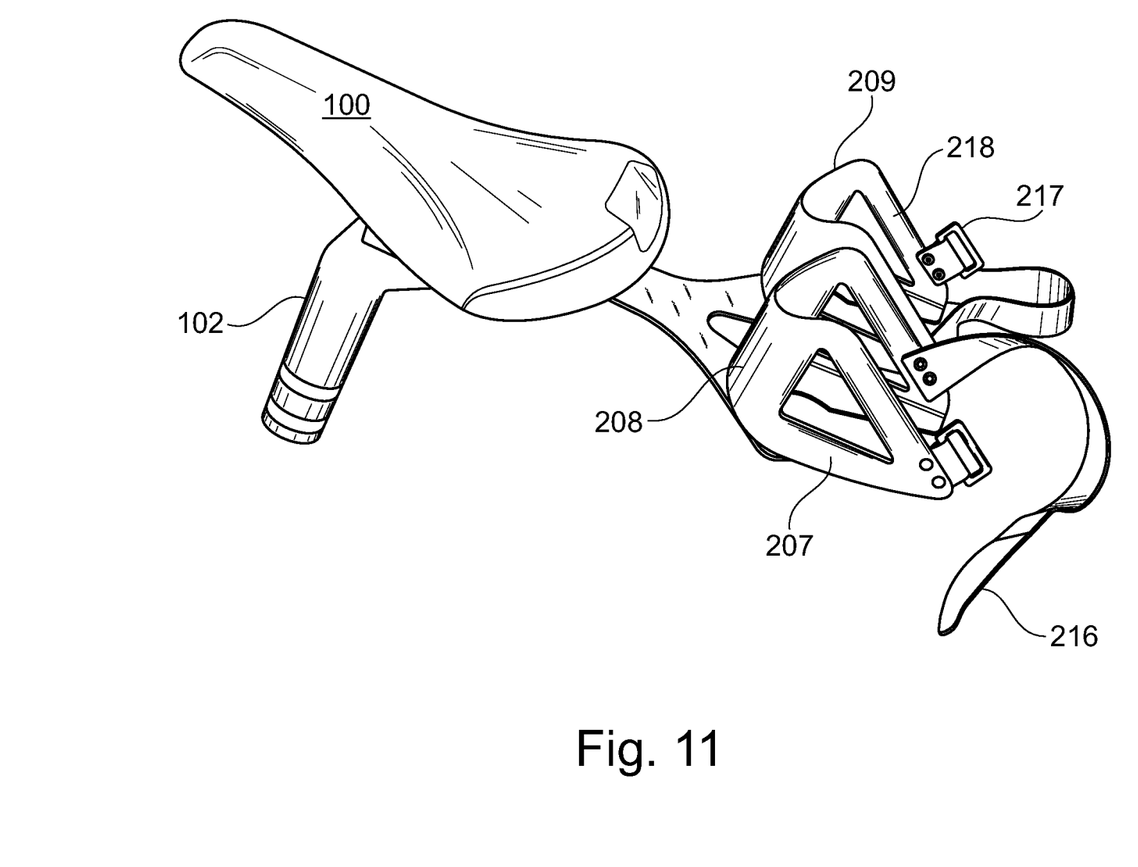
FIG. 11 is a perspective view of a bracket arm attached to saddle and attached to two shoe holders

FIG. 11 presents a perspective view of a saddle 100, obstructed view of an attachment arm 300 and a side view of two shoe holders.

Figure 12:
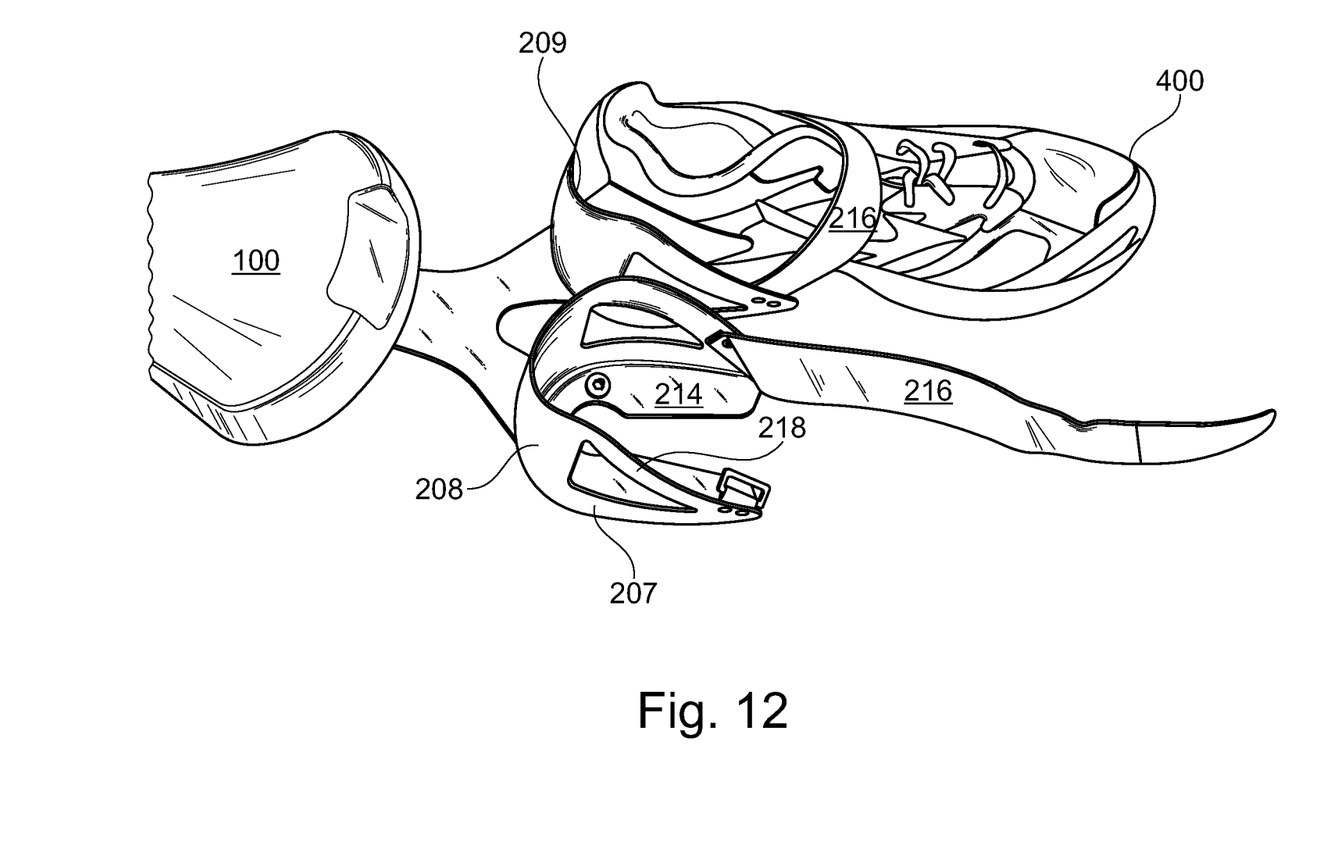
FIG. 12 is a perspective view of shoe mounted into one embodiment of the invention

FIG. 12 presents a top perspective view of a shoe 400 secured by an embodiment of the invention.

The upper arch edge 209 of the shoe holder 200 may be considered a curvature of a reversed arc and allows for manual manipulation of a contained shoe. The components of the shoe holder are biased inwardly and thus retain a shoe in face of oscillatory movement, vibration, wind resistance and other forces occurring during bicycle racing. The sidewall void areas 210 of the shoe holder provide manual access and manipulation to a retained shoe. The forward edges 202 of the disclosed shoe holder may be an initial point of contact for a shoe heel being inserted into the shoe holder.

Gripping of the shoe holder to a shoe is further achieved by the inward and outward flexing of the upper floor areas 214 of the shoe holder. The inner straight edges 203 of the shoe holder may flex so as to allow the insertion of a shoe. The configuration of the inner circle void 206 and the outer void area 204 further allow the shoe holder to flex in directions shown as directional arrow 217 in FIG. 1. Moreover, the inner circle void 206 and outer void area 204 compliment the shape and function of the antler sections 301 of the bracket arm 300. The components of the shoe holder are made of semi-rigid material to facilitate and inward bias of the shoe holder sides.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Various components, qualities and embodiments may be described in terms of the following items.

Item 1. A system for securing items to a bicycle, the system comprising:
a) an arm bracket 100, the arm bracket comprising:
i. an attachment section 318, the attachment section defining a plurality of voids and the attachment section having a wider width than a neck section 317, the neck section starting at a boundary line 318, and the neck section extending to a boundary line 302 abutting an apex 303 of an antler void area 304,
ii. two antler sections 301 attaching to the neck section at the abutting the apex of the antler void area, an inner area between the antler sections defining the antler void area; each of the two antler sections comprising an outer prong area 313 and an inner prong area 314, each antler section defining a plurality of voids 306, each pair of outer prong areas 313 and inner prong areas defining an antler void area 304
b) two shoe holders 200, each shoe holder comprising:
i. a rear retainer section 208 having an outer surface and a concave inner surface 215, and an upper arch edge 209, the rear retainer section attached to two slanted strip sections 218 and the retainer section attached to two horizontal retainer strips 207, and each horizontal retainer strip is attached to a slanted strip section, each of the two horizontal retainer strips attached to a bottom surface 201 of a shoe holder, each bottom surface attaching to a upper floor area 214, each shoe holder having upper floor areas defining an inner circle void 206 and an outer void area 204 further defined by inner straight edges 203 of the upper floor areas, the inner straight edges attached to forward edges 202 of the shoe holder, two sidewall void areas defined with in each shoe holder, and further defined by the rear retainer section, the slanted strip sections and the horizontal retainer strips.

Item 2. The system of item 1 wherein the inner circular voids and outer void areas of the shoe holder are complementary to voids defined by the outer prongs and inner prongs of the antler sections of the arm bracket.

Item 3. The system of item 2 further comprising
a) a counter plate 308 with the counter plate comprising two cylinder void areas 310 and a plurality of voids 310;
b) fasteners 312 attaching the attachment section of the arm bracket to the counter plate;
c) the shoe holders attached to each antler section by use of fasteners within voids of the shoe holders and voids within the antler sections.

Item 4. The system of item 3 wherein each shoe holder may flex inwardly and outwardly with in an area 217 between the inner edges of each shoe holder.

Item 5. The system of item 4 wherein each shoe holder further comprises a safety leash 216

Item 6. A kit for securing items to a bicycle, the kit comprising:
a) an arm bracket 100, the arm bracket comprising:
i. an attachment section 318, the attachment section defining a plurality of voids and the attachment section having a wider width than a neck section 317, the neck section starting at a boundary line 318, and the neck section extending to a boundary line 302 abutting an apex 303 of an antler void area 304,
ii. two antler sections 301 attaching to the neck section at the abutting the apex of the antler void area, an inner area between the antler sections defining the antler void area; each of the two antler sections comprising an outer prong area 313 and an inner prong area 314, each antler section defining a plurality of voids 306, each pair of outer prong areas 313 and inner prong areas defining an antler void area 304
b) two shoe holders 200, each shoe holder comprising:
i. a rear retainer section 208 having an outer surface and a concave inner surface 215, and an upper arch edge 209, the rear retainer section attached to two slanted strip sections 218 and the retainer section attached to two horizontal retainer strips 207, and each horizontal retainer strip is attached to a slanted strip section, each of the two horizontal retainer strips attached to a bottom surface 201 of a shoe holder, each bottom surface attaching to a upper floor area 214, each shoe holder having upper floor areas defining an inner circle void 206 and an outer void area 204 further defined by inner straight edges 203 of the upper floor areas, the inner straight edges attached to forward edges 202 of the shoe holder, two sidewall void areas defined with in each shoe holder, and further defined by the rear retainer section, the slanted strip sections and the horizontal retainer strips.

Item 7. The kit of item 6 wherein the inner circular voids and outer void areas of the shoe holder are complementary to voids defined by the outer prongs and inner prongs of the antler sections of the arm bracket.

Item 8. The kit of system of item 7 further comprising:
a) a counter plate 308 with the counter plate comprising two cylinder void areas 310 and a plurality of voids 310;
b) fasteners 312 attaching the attachment section of the arm bracket to the counter plate;
c) the shoe holders attached to each antler section by use of fasteners within voids of the shoe holders and voids within the antler sections.

Item 9. A method of securing shoes to a bicycle, the method using the system of item 1.

What is claimed is:
1. A system for securing items to a bicycle, the system comprising:
a pair of shoe holders comprising:
a rear retainer section having an outer surface and a concave inner surface, and an upper arch edge, the rear retainer section attached to two slanted strip sections and the retainer section attached to two horizontal retainer strips, and each horizontal retainer strip is attached to a slanted strip section, each of the two horizontal retainer strips attached to a bottom surface of a shoe holder, each bottom surface attaching to a upper floor area, each shoe holder having upper floor areas defining an inner circle void and an outer void area further defined by inner straight edges of the upper floor areas, the inner straight edges attached to forward edges of a shoe holder, two sidewall void areas defined with-in each shoe holder, and further defined by the rear retainer section, the slanted strip sections and the horizontal retainer strips;
an arm bracket attached to the pair of shoe holders, the arm bracket comprising:
an attachment section, the attachment section defining a plurality of voids and the attachment section having a wider width than a neck section, the neck section starting at a boundary line, and the next section extending to a boundary line abutting an apex of an antler void area; and
two antler sections attaching to the neck section at the abutting apex of the antler void area, an inner area between the antler sections defining the antler void area;
each of the two antler sections comprising an outer prong area and an inner prong area, each antler section defining a plurality of voids, each pair of outer prong areas and inner prong areas defining an antler void area.

2. The system of claim 1 wherein the inner circular voids and outer void areas of the shoe holder are complementary to voids defined by the outer prongs and inner prongs of the antler sections of the arm bracket.

3. The system of claim 2 further comprising
a) a counter plate with the counter plate comprising two cylinder void areas and a plurality of voids;
b) fasteners attaching the attachment section of the arm bracket to the counter plate;

c) the pair of shoe holders attached to each antler section by use of fasteners within voids of the shoe holders and voids within the antler sections.

4. The system of claim 3 wherein each shoe holder may flex inwardly and outwardly with in an area between the inner edges of each shoe holder.

5. The system of claim 4 wherein each shoe holder further comprises a safety leash.

6. A method of securing shoes to a bicycle, the method using the system of claim 1.

7. A kit for securing items to a bicycle, the kit comprising: a pair of shoe holders comprising:
a rear retainer section having an outer surface and a concave inner surface, and an upper arch edge, the rear retainer section attached to two slanted strip sections and the retainer section attached to two horizontal retainer strips, and each horizontal retainer strip is attached to a slanted strip section, each of the two horizontal retainer strips attached to a bottom surface of a shoe holder, each bottom surface attaching to a upper floor area, each shoe holder having upper floor areas defining an inner circle void and an outer void area further defined by inner straight edges of the upper floor areas, the inner straight edges attached to forward edges of the shoe holder, two sidewall void areas defined with in each shoe holder, and further defined by the rear retainer section, the slanted strip sections and the horizontal retainer strips;

an arm bracket, the arm bracket comprising:
an attachment section, the attachment section defining a plurality of voids and the attachment section having a wider width than a neck section, the neck section starting at a boundary line, and the neck section extending to a boundary line abutting an apex of an antler void area; and
two antler sections attaching to the neck section at the abutting the apex of the antler void area, an inner area between the antler sections defining the antler void area; each of the two antler sections comprising an outer prong area and an inner prong area, each antler section defining a plurality of voids, each pair of outer prong areas and inner prong areas defining an antler void area.

8. The kit of claim 7 wherein the inner circular voids and outer void areas of each shoe holder are complementary to voids defined by the outer prongs and inner prongs of the antler sections of the arm bracket.

9. The kit of system of claim 8 further comprising:
a) a counter plate with the counter plate comprising two cylinder void areas and a plurality of voids;
b) fasteners attaching the attachment section of the arm bracket to the counter plate;
c) the shoe holders attached to each antler section by use of fasteners within voids of the shoe holders and voids within the antler sections.

\* \* \* \* \*